United States Patent Office 3,394,101
Patented July 23, 1968

3,394,101
METHOD OF MASTERBATCHING REINFORCING PIGMENTS WITH ELASTOMERIC POLYMERS
Stanley M. Hirshfield, Trenton, N.J., assignor to Columbian Carbon Company, New York, N.Y., a corporation of Delaware
No Drawing. Filed Aug. 14, 1963, Ser. No. 301,989
9 Claims. (Cl. 260—41.5)

This invention relates to a process for compounding iso-olefinic polymers, and more particularly, provides a process for masterbatching rubber reinforcing pigments, such as carbon black, with low temperature iso-olefinic homopolymers and copolymers, e.g., butyl rubber.

Carbon black is widely used as a reinforcing agent in rubber. Conventionally, carbon black or like reinforcing pigment such as silica, has been incorporated into rubbery polymers by vigorous high shear milling in a suitable mixer, for instance, a Banbury. However, during commercial mixing operations of this type, the carbon black tends to agglomerate in the rubber, thereby producing large clumps of pigment and an unsatisfactory degree of pigment dispersion. This has been found to be particularly true in the case of butyl rubber.

Recently, processes of the type wherein the carbon black is dispersed in the latex form of the rubber have found wide use in the rubber industry and have overcome many of the disadvantages of conventional dry mixing. However, while extremely effective with natural and styrene-butadiene rubbers, these latex masterbatching processes cannot be practically applied to those polymers not available or readily obtainable in latex form, including butyl rubber.

Still more recently, various processes of the type wherein the carbon black is mixed with a solution of the rubber in an organic solvent have been proposed. These so-called "solution masterbatching" processes have been successfully applied to the masterbatching of carbon black with a large number of polymers, including the polybutadiene rubbers, polyisoprene and butyl rubber, and have been found to be especially valuable in the case of those polymers which are produced by solution polymerization and are soluble in the solvent in which they are polymerized, e.g., cis-polybutadiene.

However, in the cases of butyl rubber and polyisobutylene which are insoluble in their polymerization reaction media, it is necessary to first recover the polymer and dissolve it in a suitable organic solvent to form the rubber solution before carrying out the solution masterbatching operation. Thus, in the preparation of reinforcing pigment-butyl rubber masterbatches, in accordance with these solution masterbatching processes, a number of additional and costly steps are required.

My present invention provides an extremely effective and simple process for masterbatching rubbery polymers of iso-olefins and copolymers of iso-olefins and diolefins, i.e., butyl rubber with rubber reinforcing pigments, such as carbon black, and utilizes in a novel way the characteristic of the solid polymer particles to be insoluble in and swollen by the reaction medium in which they are polymerized. Thus, my process obviates the need for obtaining the polymer in dry, latex or solution forms as required by previously proposed masterbatching methods, and has the additional advantage of applicability to a continuous low cost operation. Further, I have found that the resultant masterbatch is characterized by an excellent degree of dispersion of the reinforcing pigment in the polymer. Various other objects and advantages of the invention will appear from the following detailed description thereof, and the novel features thereof will be particularly pointed out hereinafter in connection with the appended claims.

In accordance with my present process, I have found that excellent reinforcing pigment-iso-olefinic polymer masterbatches are prepared by uniformly mixing the pigment with a slurry of solid polymer particles suspended in and swollen by the reaction medium in which the polymerization is conducted.

The polymers to which the present invention applies are obtained by polymerizing iso-olefins having from 4 to 7 carbon atoms either alone or with a small amount of a conjugated diolefin having from 4 to 10 carbon atoms in the presence of a Freidel-Crafts type catalyst dissolved in a low-freezing, non-complex forming solvent at a reaction temperature of between about —40° and —160° C. A particularly valuable iso-olefin homopolymer prepared by this procedure is polyisobutylene. The polymer known in the industry as butyl rubber is prepared commerically by copolymerizing 85 to 99.5 weight percent of isobutylene with 0.5 to 15 weight percent of a conjugated diolefin, advantageously isoprene.

While isobutylene is the presently preferred iso-olefin for use in the preparation of butyl rubber, other iso-olefins may be used. Likewise, while isoprene is the presently preferred conjugated diolefinic material, other conjugated diolefins may be employed including butadiene, piperylene and 2,3-dimethyl-1,3-butadiene. If desired, small amounts of one or more additional hydrocarbon reactants such as divinyl benzene, cyclopentadiene or styrene may also be present.

The polymerization reaction is preferably conducted by admixing the reactants with an alkyl halide diluent and adding the catalyst thereto as a solution in a low-freezing inert solvent. Generally, an alkyl halide having from 1 to 4 carbon atoms, e.g., methyl chloride, is employed as both the diluent for the reactants and the solvent for the catalyst. The reaction temperature, as previously noted, is maintained within the range of from —40° to —160° C.

The Friedel-Crafts type catalyst employed is advantageously aluminum chloride, although boron trifluoride may be used as may other similar active metal catalysts such as $TiCl_4$ or $ZrCl_4$. The catalyst solution may be introduced, for example, by spraying it onto the surface of a rapidly stirred mixture of the reactants, or by mixing it directly into the body of the agitated reaction mixture.

The polymerization begins promptly and may approach completion within a few minutes, the polymer forming as a slurry of solid, finely-divided, swollen or expanded particles in the cold reaction medium, which essentially is the alkyl halide diluent, but which may also contain small amounts of unreacted monomers and catalyst. As previously noted and as hereinafter more fully shown, I form a masterbatch by mixing carbon black or like reinforcing pigment with the polymer while it is in this swollen state.

The reinforcing pigment may be added to the polymer slurry, in accordance with my process, in particulate form or as a slurry in suitable organic liquid which is not a solvent for the polymer. When it is desired to add the pigment in slurry form, the slurry liquid may preferably be an alkyl halide such as is used as the diluent in the polymerization reaction, e.g., methyl chloride. However, other slurry liquids may be used provided they do not deleteriously affect the nature of the polymer particles to be insoluble in and swollen by the reaction medium. Examples of such liquids are liquefied ethylene and methylene chloride.

When it is desired to mix the reinforcing pigment in slurry form with the polymer slurry in an enclosed mixing chamber, the pigment slurry should be at a temperature which is substantially the same as that of the polymer slurry so as to avoid explosion due to rapid vaporization of the slurry liquid.

The concentration of solid polymer in the polymer slurry does not appear to be particularly critical and may conveniently be the same as the concentration of solid polymer in the slurry obtained from the reactor, which generally is less than about 30 percent by weight, for instance from about 10 to 20 percent. However, more concentrated slurries obtained by removing a portion of the slurry liquid, or more dilute slurries obtained by adding cold polymerization diluent thereto, e.g., methyl chloride, offer no particular problems.

The process may be conducted batchwise or in a continuous manner by continuously mixing the reinforcing pigment either in particulate form or as a cold slurry, as previously noted, with a continuously flowing confined stream of polymer slurry. In either case, it is important that the mixing be vigorous enough to effect incorporation of the pigment in the swollen polymer particles.

After the reinforcing pigment has been incorporated into the swollen polymer particles, the slurry liquid is removed by any of the known means, for instance, by charging the mixture to a flash tank containing warm water to volatilize the slurry liquid. Thereafter, the pigment-polymer masterbatch may be separated, dried and further processed according to conventional methods.

The reinforcing pigments which may be masterbatched with iso-olefin homopolymers and copolymers in accordance with the invention include carbon black, silica and titanium dioxide. The amount of pigment which may be incorporated in the polymer may range as high as 150–200 parts per 100 parts of polymer (dry weight basis), although the preferred proportion, particularly when the pigment is carbon black, is generally within the range of from about 25 to 70 parts per 100 parts of polymer solid.

The invention will now be further described by the following example, which will be understood to be illustrative only and in no way restrictive of the invention.

Example 1

A solid isobutylene homopolymer was prepared by subjecting a mixture or 466 grams of condensed isobutylene and 290 grams of condensed methyl chloride to rapid stirring in a 3-neck 1000 ml. flask immersed in a Dry-Ice-acetone bath (−78° C.) and equipped with a "Lightnin Mixer." The polymerization was carried out in the absence of oxygen and moisture, and was catalyzed by adding a methyl chloride solution of anhydrous aluminum chloride at a 0.039 molar concentration to the rapidly stirred mixture until a 36% conversion level was reached.

A slurry of swollen polyisobutylene particles in the cold reaction medium resulted which had the appearance of a white slime. The concentration of solid polymer in the slurry was 29 percent by weight (170 g. of polymer solid).

Dry micropulverized carbon black, in an amount of 70 grams, was added to the polyisobutylene slurry, which was still at polymerization temperature, and was vigorously mixed therewith by means of the "Lightnin Mixer" operated at 1500 r.p.m. The mixing time was approximately one minute. Visual observation of the resultant mixture indicated that substantially all of the black had been incorporated in the polyisobutylene.

The masterbach was then recovered from the slurry and dried. The degree of dispersion of the carbon black in the masterbatch was found to be excellent. The total recovered weight of the masterbatch was 240 grams, of which approximately 70 grams was found to be carbon black.

I claim:
1. A method of dispersing a reinforcing pigment in an elastomeric polymer selected from the group consisting of homopolymers of $C_4$ to $C_7$ isoolefins and copolymers comprising 85 to 99.5% $C_4$ to $C_7$ iso-olefin and 15 to 0.5% $C_4$ to $C_{10}$ conjugated diolefin, the polymerization reaction being conducted at a temperature of from −40° to −160° C. in the presence of a Friedel-Crafts catalyst and in a reaction medium that comprises an alkyl halide having from 1 to 4 carbon atoms, said polymer forming as a slurry of swollen particles in the cold reaction medium, comprising:
(a) mixing the slurry of polymer in the reaction medium with simple agitation sufficient to uniformly disperse the pigment in said polymer, and thereafter
(b) separating the pigment-polymer mixture from the slurry liquid;
whereby the dispersion of the pigment in the polymer is accomplished without the necessity for converting the polymer to dry, latex or solution form and without the need for subjecting the mass to high shear milling in order to uniformly disperse the pigment in the elastomeric polymer.

2. Method as in claim 1, wherein the pigment is carbon black.

3. Method as in claim 1, wherein the alkyl halide is methyl chloride.

4. Method as in claim 1, wherein the concentration of polymer in said slurry is greater than about 10 percent, but less than about 30 percent by weight.

5. Method as in claim 1, wherein said polymer is polyisobutylene.

6. Method as in claim 1, wherein the iso-olefin is isobutylene and the conjugated diolefin is isoprene.

7. Method as in claim 1, wherein the reinforcing pigment mixed with the polymer slurry is in dry particulate form.

8. Method as in claim 1, wherein the reinforcing pigment is added to and mixed with the polymer slurry as a slurry in an organic liquid which is a non-solvent for the polymer, said organic liquid being miscible with said reaction medium and forming with said reaction medium a liquid medium such that the reinforcing pigment ends to migrate preferentially to the swollen polymer particles.

9. Method as in claim 8, wherein the slurry liquid of the pigment slurry comprises a $C_1$ to $C_4$ alkyl halide and the slurry liquid of the polymer slurry comprises a $C_1$ to $C_4$ alkyl halide.

References Cited

UNITED STATES PATENTS

| | | | |
|---|---|---|---|
| 2,829,118 | 4/1958 | Wehr | 260—41 |
| 2,497,346 | 2/1950 | Collins | 260—34.2 |
| 3,055,856 | 9/1962 | Sutherland | 260—41.5 |
| 3,244,660 | 4/1966 | Herold | 260—33.8 |

FOREIGN PATENTS

| | | |
|---|---|---|
| 523,248 | 7/1940 | Great Britain. |
| 745,835 | 3/1956 | Great Britain. |

ALLAN LIEBERMAN, *Primary Examiner.*